United States Patent [19]

Chomel

[11] Patent Number: 5,002,444

[45] Date of Patent: Mar. 26, 1991

[54] MACHINE TOOL HOLDER WITH AUTOMATIC HOOK-UP

[75] Inventor: Claude A. R. Chomel, Maisse, France

[73] Assignee: S.N.E.C.M.A. (Societe Nationale D'Etude et de Construction de Mateurs D'Aviation), Paris, France

[21] Appl. No.: 543,542

[22] Filed: Jun. 26, 1990

[30] Foreign Application Priority Data

Jun. 28, 1989 [FR] France .................. 89 08596

[51] Int. Cl.⁵ .............................................. B23B 31/26
[52] U.S. Cl. ................................... 409/233; 409/232; 409/234
[58] Field of Search ............... 409/233, 231, 232, 234

[56] References Cited

U.S. PATENT DOCUMENTS

| | | | |
|---|---|---|---|
| 4,057,881 | 11/1977 | Stephens | 29/27 C |
| 4,611,377 | 9/1986 | McCormick et al. | 29/407 |
| 4,793,053 | 12/1988 | Zuccaro et al. | 279/4 X |

FOREIGN PATENT DOCUMENTS 0126195 10/1983 European Pat. Off. .

Primary Examiner—Steven C. Bishop
Attorney, Agent, or Firm—Bacon & Thomas

[57] ABSTRACT

The present invention relates to a system for attaching a tool holder to a machine tool which includes an automatic hook-up of an electrical, pneumatic or hydraulic connector to supply power to the tool holder. The system includes an attaching sleeve slidably mounted on the tool holder mounting stud. A spring interposed between the mounting stud and the attaching sleeve exerts a biasing force on the attaching sleeve. The power connector is separable and has a portion attached to the machine tool and a mating portion movably attached to the tool holder. A pin interconnects the attaching sleeve and the movable mating portion of the connector.

4 Claims, 1 Drawing Sheet

MACHINE TOOL HOLDER WITH AUTOMATIC HOOK-UP

BACKGROUND OF THE INVENTION

The present invention relates to a machine tool holder, which may be associated with a machine tool turret, having an automatic power hook-up with the machine tool.

When setting up a tool holder on a machine tool, it is frequently necessary to hook-up a device mounted on the tool holder to a connector mounted on the machine tool which may supply electrical, pneumatic or hydraulic power to the tool holder. The connection between the machine tool and the tool holder transmits electrical, pneumatic or hydraulic power to the tool so that various tool functions may be carried out. Generally, these hook-ups require separate operations manually carried out by the machine tool operator, thereby lengthening the set up time and introducing the possibility of incomplete or incorrect hook-up resulting in improper operation of the tool.

A known tool holder mounting is illustrated in FIGS. 1 and 2. As illustrated, the machine tool 1 defines an opening into which is inserted the mounting stud for the tool holder 2. A gripping slider 3 is movably attached to the machine tool 1 such that, when in the position shown in FIG. 1, it is expanded so as to facilitate the insertion of the mounting stud of the tool holder 2.

As illustrated in FIG. 2, movement of the gripping slider 3 in the direction of arrow 4 causes the angled surfaces 5 and 6 to slide against one another, thereby urging the flange 8 into contact with the surface 9 of flange 7 formed on the mounting stud. Further movement of the gripping slider 3 pulls the stud and the tool holder 2 towards the machine tool 1 in the direction of arrow 4 until teeth 10 on the tool holder 2 are in engagement with the teeth 11 formed on the machine tool 1. This engagement locks the tool holder 2 into its proper position on the machine tool 1.

SUMMARY OF THE INVENTION

The present invention relates to a system for attaching a tool holder to a machine tool which includes an automatic hook-up of an electrical, pneumatic or hydraulic connector to supply power to the tool holder. The system includes an attaching sleeve slidably mounted on the tool holder mounting stud. A spring interposed between the mounting stud and the attaching sleeve exerts a biasing force on the attaching sleeve. The power connector is separable and has a portion attached to the machine tool and a mating portion movably attached to the tool holder. A pin interconnects the attaching sleeve and the movable mating portion of the connector.

When the mounting stud of the tool holder is inserted into an opening defined in the machine tool, the attaching sleeve also extends into the opening. A flange formed on the attaching sleeve is engaged by the gripping slider of the machine tool. Movement of the gripping slider urges the attaching sleeve and the tool holder against the machine tool until teeth formed on the tool holder and the machine tool are in mutual engagement. The spring force acting between the tool holder mounting stud and the attaching sleeve is such that the tool holder and attaching sleeve move as a unit until the teeth are in mutual engagement.

Further movement of the gripping slider causes relative movement between the attaching sleeve and the mounting stud. This movement of the attaching sleeve moves the movable mating connector portion into engagement with the opposite connector portion on the machine tool.

The system according to the invention provides an automatic hook-up between the tool holder and the machine tool that is easily operable, safe and reliable. The system is particularly applicable to multiple-connector pickups used in automated machining systems.

DETAILED DESCRIPTION OF THE PREFERRED EMBODIMENT

Figure 4:
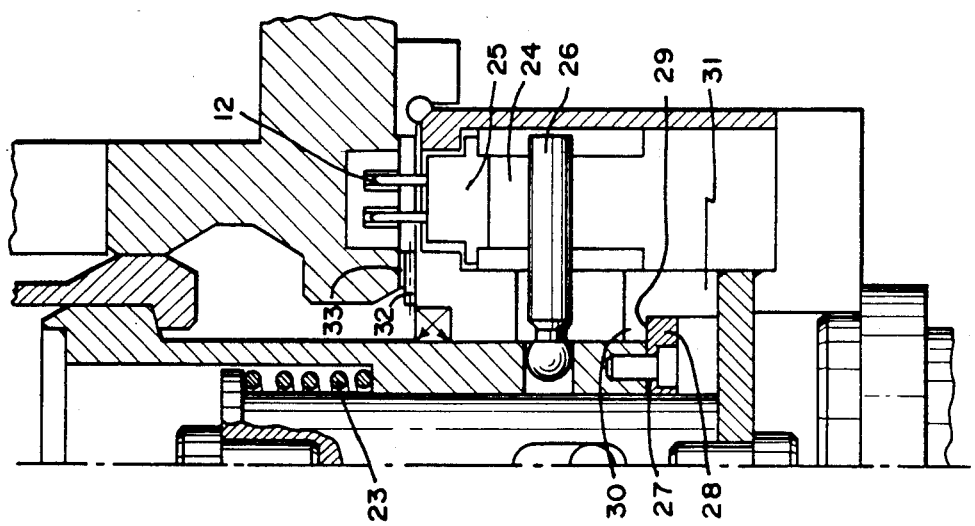
FIG. 4 is a partial, cross-sectional view similar to FIG. 3 illustrating the tool holder attached to the machine tool with the connector elements engaged.
Figure 3:
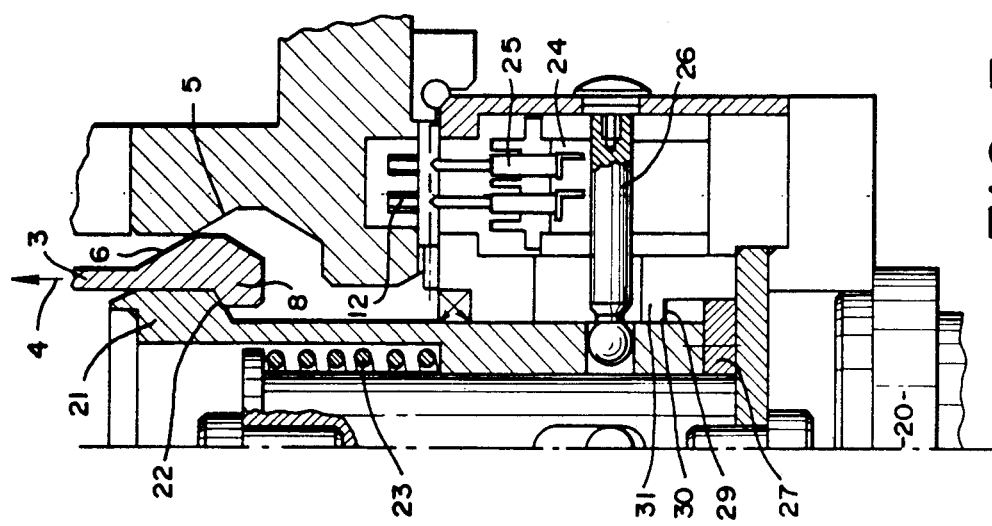
FIG. 3 is a partial, cross-sectional view of the system according to the invention illustrating the tool holder attached to the machine tool, with the connector portions disengaged.

The system according to the invention, as illustrated in FIGS. 3 and 4, comprises a machine tool 1 having a slidable gripper sleeve 3 movable with respect to the machine tool 1 in the direction of arrow 4. The actuation of the gripper slider 3 is achieved by any means known in the art and the operation of this gripper slider is the same as that previously described and illustrated in FIGS. 1 and 2. Movement of the gripper slider 3 in the direction of arrow 4 causes sliding between the angled surfaces 5 and 6 so as to urge flange 8 into contact with surface 22 flange 21 formed on attaching sleeve 19.

Attaching sleeve 19 is slidably mounted about mounting stud 20a integrally attached to the tool holder 20. A compression coil spring 23 operatively interposed between the mounting stud 20a and the attaching sleeve 19 exerts a biasing force on the attaching sleeve 19 urging it downwardly as illustrated in FIG. 3.

Machine tool has a portion 12 of a separable connector attached thereto. The mating portion 24 of the connector is movably attached to the tool holder 20. Connector portion 24 may have connector elements 25 extending therefrom which engage the connector portion 12. Movable mating connector portion 24 is connected to the attaching sleeve 19 via pin 26. Quite obviously, the relative positions of the connector elements may be reversed without exceeding the scope of this invention.

Figure 1:
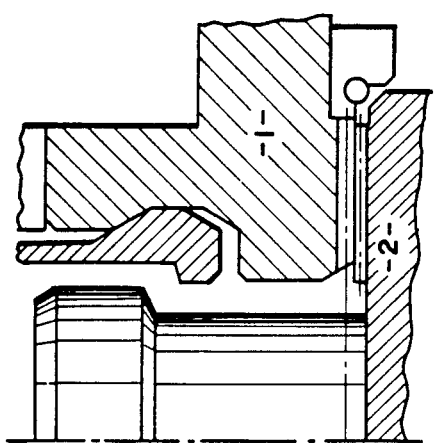
FIG. 1 is a partial, cross-sectional view of a known type of tool holder attaching system in the released position.
Figure 2:
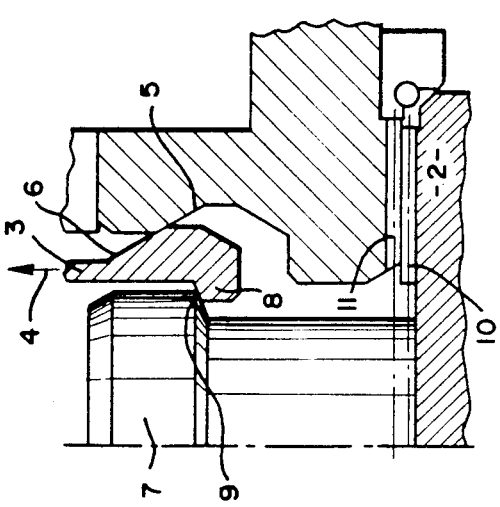
FIG. 2 is a partial, cross-sectional view of the system shown in FIG. 1 with the gripping slider engaged with the tool holder mounting stud.

In operation, the mounting stud 20a and the attaching sleeve 19 are inserted into the machine tool 1 when the gripping slider 3 is in the position shown in FIG. 1. Movement of the gripping slider 3 in the direction of arrow 4 causes engagement of the flange 8 with the surface 22 formed on the flange 21 to thereby pull the tool holder 20 towards the machine tool 1. The biasing force exerted on the attaching sleeve 19 is such that the attaching sleeve 19 and the tool holder 20 move toward the machine tool 1 as a unit with no relative movement between them.

Such movement continues until the teeth 32 formed on the tool holder 20 are in engagement with the teeth 33 formed on the machine tool 1. As illustrated in FIG. 3, the position of the mating connector portion 24 is such that it is out of mating engagement with the connector portion 12 located on the machine tool 1.

Since, at this point, further movement of the tool holder 20 in the direction of arrow 4 is prohibited by its contact with the machine tool further movement of gripping slider 3 causes attaching sleeve 19 to move with respect to the attaching stud 20a, overcoming the biasing force exerted thereon by spring 23. Such further movement of the attaching sleeve 19 also causes movement of the mating connector portion 24 due to the interconnection of these elements by pin 26. Movement of mating portion 24 brings the connector prongs 25 into mating engagement with the connector portion 12 located on the machine tool 1.

Stop means are provided to limit the relative movement of the attaching sleeve 19 and the mounting stud 20a so as to prevent damage to the connector prongs 25. The stop means may comprise a flange 28 attached to a lower portion 27 of the attaching sleeve 19 which interacts with a flange 30 formed on stop member 31 fixedly attached to the tool holder 20. As can been seen in FIG. 4, the flange 28 contacts a surface 29 of the flange 30 to limit the upward movement of the attaching sleeve 19.

Although a separable electrical connector has been illustrated, it is to be understood that any separable connector such as a pneumatic or hydraulic connector, may be utilized with this system without exceeding the scope of this invention.

The foregoing description is provided for illustrative purposes only and should not be construed as in any way limiting this invention, the scope of which is defined solely by the appended claims.

What is claimed is:

1. A system for attaching a tool holder to a machine tool having mutually engaging teeth formed on the toolholder and the machine tool, comprising:

(a) a mounting stud fixedly attached to the tool holder;
   (b) an attaching sleeve slidably associated with the mounting stud;
   (c) a separable connector assembly having a portion attached to the machine tool and a mating portion movably attached to the tool holder;
   (d) movable gripping means operatively associated with the machine tool and adapted to grip the attaching sleeve and bring the tool holder into engagement with the machine tool and that the teeth on the tool holder and machine tool are engaged;
   (e) biasing means operatively associated with the attaching sleeve so as to exert a biasing force thereon, the biasing force being of such magnitude that the gripping means moves the attaching sleeve and tool holder as a unit until engagement of the teeth at which time further movement of the gripping means overcomes the biasing force and causes the attaching sleeve to move relative to the mounting stud; and,
   (f) connecting means connecting the attaching sleeve and the movable portion of the separable connector such that movement of the attaching sleeve brings the connector portions into mating engagement.

2. The system according to claim 1 wherein the biasing means comprises spring means operatively interposed between the mounting stud and the attaching sleeve.

3. The system according to claim 1 wherein the connecting means comprises a pin connecting the movable portion of the separable connector to the attaching sleeve.

4. The system according to claim 1, further comprising:

(a) stop means fixedly attached to the tool holder; and,
   (b) a stop flange on the attaching sleeve and located so as to contact the stop means thereby limiting relative movement between the attaching sleeve and the mounting stud.

* * * * *

UNITED STATES PATENT AND TRADEMARK OFFICE
CERTIFICATE OF CORRECTION

PATENT NO. : 5,002,444

DATED : March 26, 1991

INVENTOR(S) : CHOMEL

It is certified that error appears in the above-identified patent and that said Letters Patent is hereby corrected as shown below:

Column 2, line 48, after "tool" insert --1--.

Signed and Sealed this

Fifth Day of January, 1993

Attest:

DOUGLAS B. COMER

*Attesting Officer*   Acting Commissioner of Patents and Trademarks